United States Patent
Kasha et al.

(10) Patent No.: US 11,133,718 B2
(45) Date of Patent: Sep. 28, 2021

(54) ELECTRIC MACHINE WITH SLOT CLOSERS

(71) Applicant: Ford Global Technologies, LLC, Dearborn, MI (US)

(72) Inventors: Andrew Kasha, Dearborn, MI (US); Jacob Krizan, Farmington Hills, MI (US); Chun Tang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 562 days.

(21) Appl. No.: 16/032,537

(22) Filed: Jul. 11, 2018

(65) Prior Publication Data
US 2020/0021159 A1  Jan. 16, 2020

(51) Int. Cl.
*H02K 3/487* (2006.01)
*H02K 1/14* (2006.01)
*H02K 3/34* (2006.01)

(52) U.S. Cl.
CPC .............. *H02K 3/487* (2013.01); *H02K 1/148* (2013.01); *H02K 3/345* (2013.01)

(58) Field of Classification Search
CPC .... H02K 1/148; H02K 2213/03; H02K 29/03; H02K 3/345; H02K 3/487; H02K 3/493
See application file for complete search history.

(56) References Cited

U.S. PATENT DOCUMENTS

| | | | |
|---|---|---|---|
| 4,427,910 A | | 1/1984 | Richter et al. |
| 5,654,603 A | * | 8/1997 | Sung ............... H02K 3/493 |
| | | | 310/214 |
| 6,683,398 B2 | * | 1/2004 | Tong ............... H02K 3/493 |
| | | | 310/214 |
| 8,129,880 B2 | | 3/2012 | Rahman et al. |
| 2010/0127592 A1 | | 5/2010 | Yu et al. |
| 2010/0253176 A1 | | 10/2010 | Ovrebo et al. |
| 2014/0028145 A1 | * | 1/2014 | Luise ............... H02K 3/493 |
| | | | 310/214 |

OTHER PUBLICATIONS

Giulio De Donato et al., Integral-Slot Versus Fractional-Slot Concentrated-Winding Axial-Flux Permanent-Magnet Machines: Comparative Design, FEW, and Experiment Tests, IEEE Transactions on Industry Applications, vol. 48, No. 5, Sep./Oct. 2012, pp. 1487-1495, 9 pages.

* cited by examiner

*Primary Examiner* — Thienvu V Tran
*Assistant Examiner* — Bart Iliya
(74) *Attorney, Agent, or Firm* — David B Kelley; Brooks Kushman P.C.

(57) ABSTRACT

An electric machine includes a stator having teeth that define open slots and slot closers disposed in the slots. Each slot closers includes a flux bridge surrounded by a nonmagnetic case. The slot closer is disposed between adjacent ones of the teeth with the case engaging and spanning the adjacent teeth. The case forms nonmagnetic gaps between the flux bridge and the adjacent teeth, respectively, to reduce potential for torque ripple.

17 Claims, 5 Drawing Sheets

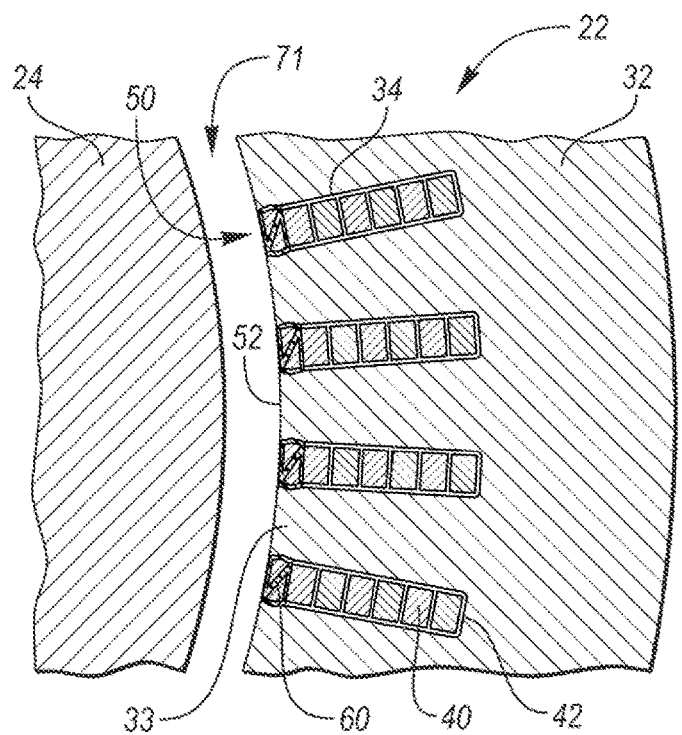
FIG. 3
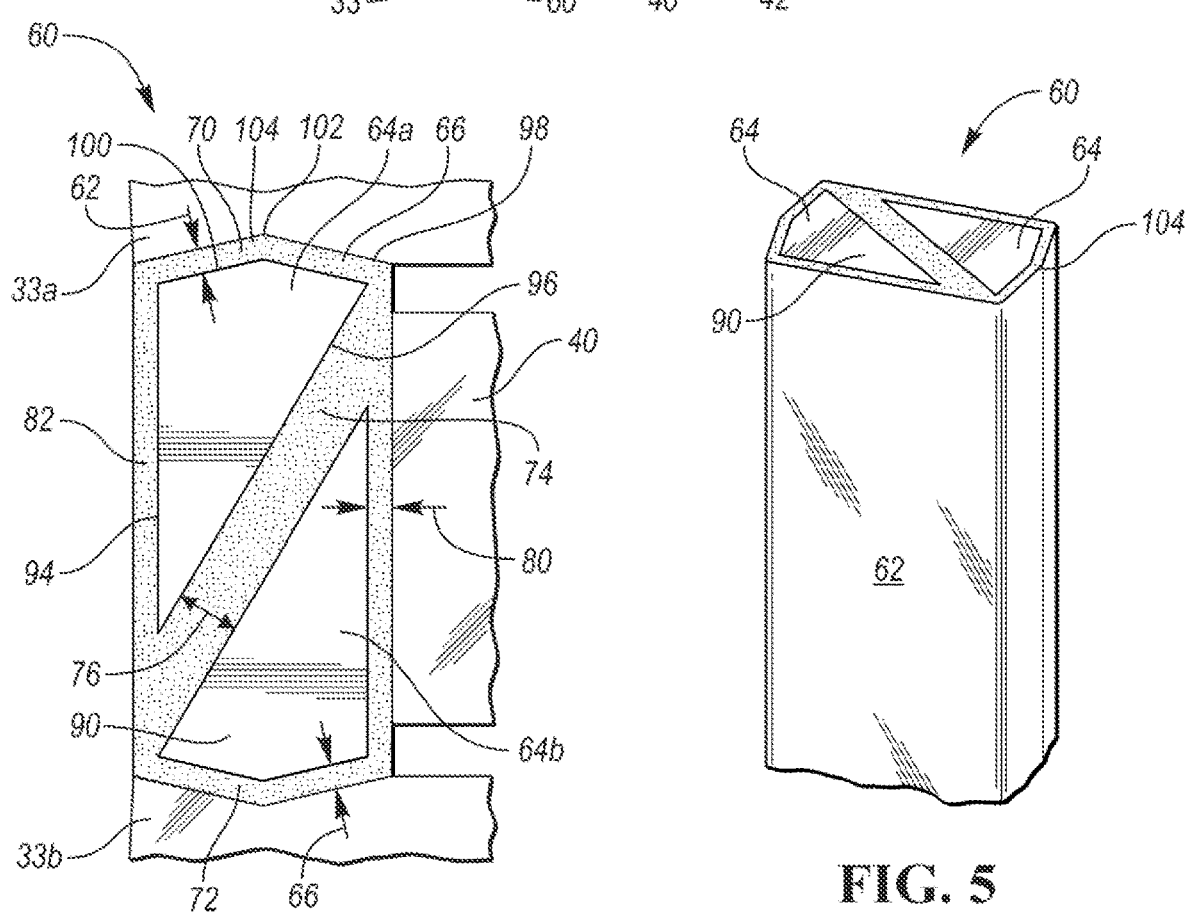
FIG. 4
FIG. 5

ELECTRIC MACHINE WITH SLOT CLOSERS

TECHNICAL FIELD

The present disclosure relates to electric machines and more specifically to electric machines that include slot closers.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

According to one embodiment, an electric machine includes a stator having teeth that define open slots and slot closers disposed in the slots. Each slot closers includes a flux bridge surrounded by a nonmagnetic case. The slot closer is disposed between adjacent ones of the teeth with the case engaging and spanning the adjacent teeth. The case forms nonmagnetic gaps between the flux bridge and the adjacent teeth, respectively, to reduce potential for torque ripple.

According to another embodiment, an electric machine includes a stator having radially extending teeth that define slots between adjacent teeth. The slots have slot openings defined between tips of the adjacent teeth. Slot closers are disposed in the openings to close the slots. Each of the slot closers includes a nonmagnetic case that spans an associated one of the openings and a flux bridge disposed in the case with the flux bridge fully surrounded by the case.

According to yet another embodiment, a method of assembling a stator includes providing a stator core having slots with openings, and winding conductors in the slots. The method further includes fabricating a flux bridge from a ferromagnetic material, encapsulating the flux bridge in a nonmagnetic case to form a slot closer, and inserting the slot closer into one of the openings such that the nonmagnetic case forms at least one nonmagnetic gap between the flux bridge and stator to reduce potential for torque ripple.

BRIEF DESCRIPTION OF THE DRAWINGS

FIG. 3 is an axial cross-sectional view of a portion of the electric machine.

FIG. 4 is a magnified view of a slot closer of FIG. 3.

FIG. 5 is a perspective view of a flux bridge.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
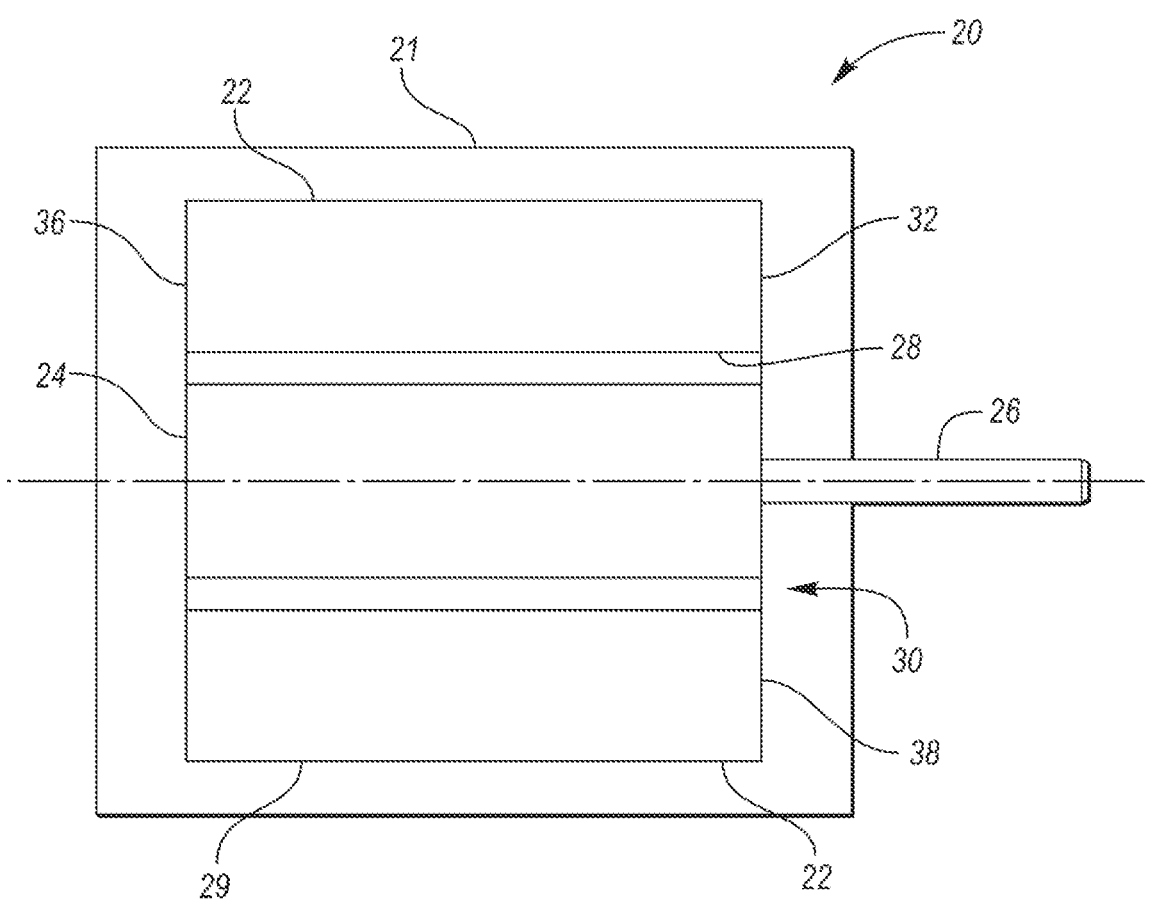
FIG. 1 is a schematic diagram of an electric machine.

Referring to FIG. 1, an electric machine 20 may be used in a vehicle such as a fully electric vehicle or a hybrid-electric vehicle. Of course, the electric machine 20 may also be used in non-vehicle applications. The electric machine 20 may be referred to as an electric motor, a traction motor, a generator, or the like. The electric machine 20 may be a permanent magnet machine, an induction machine, or the like. The electric machine 20 is capable of acting as both a motor and a generator.

In a vehicle context, the electric machine 20 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine. For example, a typical traction battery may provide a DC voltage while the electric machine 20 may require a three-phase alternating current (AC) voltage to function. The power electronics module may include an inverter that converts the DC voltage to a three-phase AC voltage as required by the electric machine 20. In a regenerative mode, the power electronics module may convert the three-phase AC voltage from the electric machine 20 acting as generators to the DC voltage required by the traction battery.

Figure 2:
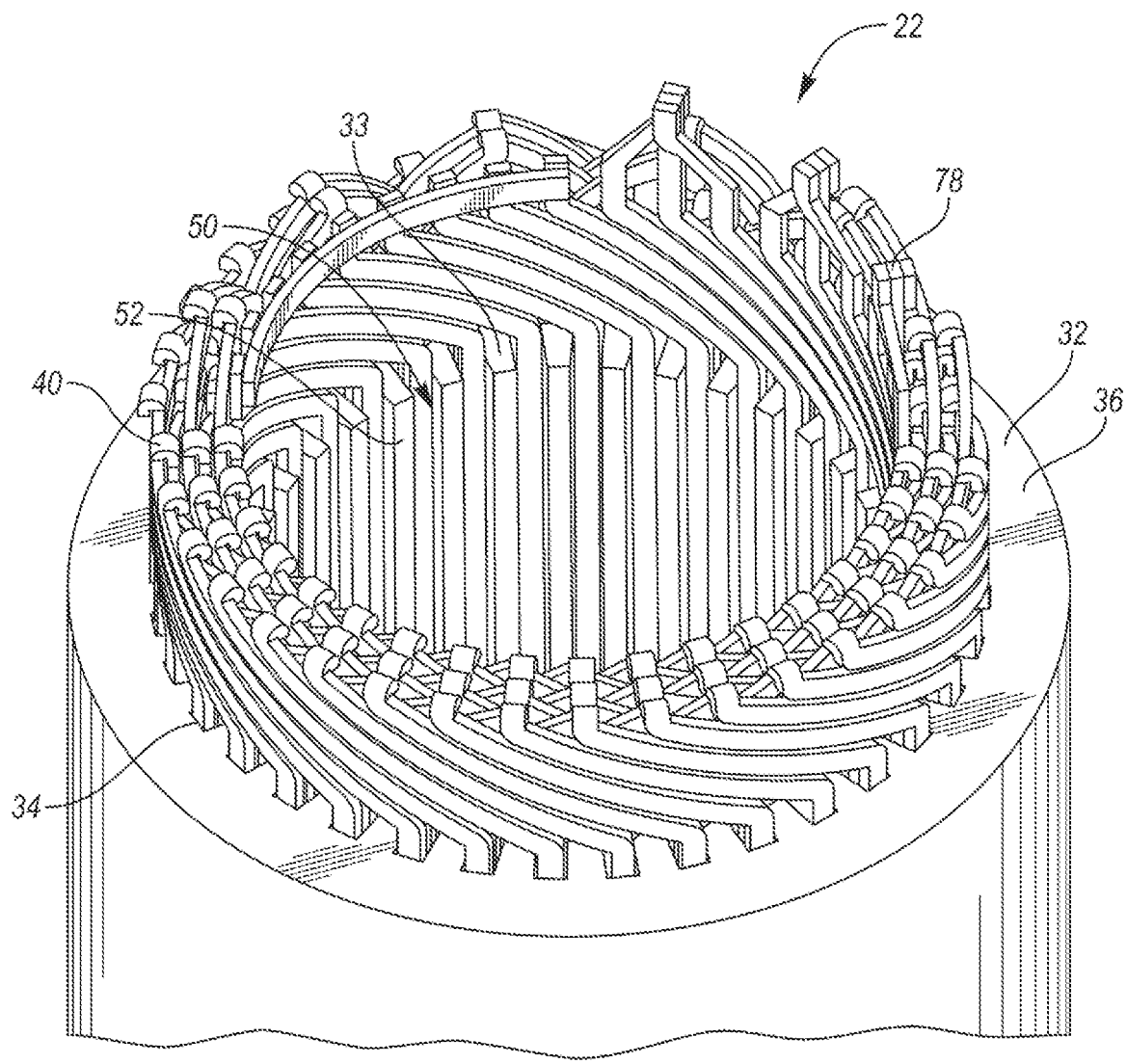
FIG. 2 is a perspective view of one end of a stator of the electric machine showing all winding paths.

Referring to FIGS. 1 and 2, the electric machine 20 includes a housing 21 that encloses the stator 22 and the rotor 24. The stator 22 is fixed to the housing 21 and includes a cylindrical core 32 having an inner diameter 28 that defines a hole 30 and an outer diameter 29. The core 32 may be formed from a plurality of stacked laminations. The rotor 24 is supported for rotation within the hole 30. The rotor 24 may include windings or permanent magnets that interact with windings of the stator 22 to generate rotation of the rotor 24 when the electric machine 20 is energized. The rotor 24 may be supported on a driveshaft 26 that extends through the housing 21.

The stator core 32 has teeth 33 that define slots 34 between adjacent teeth. The slots 34 are circumferentially arranged around the core 32 and extending outward from the inner diameter 28. The slots 34 may be equally spaced around the circumference and extend axially from a first end 36 of the core 32 to a second end 38. In the illustrated embodiment, the core 32 defines thirty-six slots, but the core 32 may include more or fewer slots in other embodiments. The electric machine 20 includes windings 40 placed in the slots 34 of the core 32 between a radially outer end 42 and an opening of the slot. The windings may be hairpin windings, (as shown) distributed windings, or concentrated windings. The windings 40 may include multiple phases, e.g., three, and each phase may include multiple parallel paths. An insulator, such as paper, may be provided between the windings 40 and the core 32.

FIG. 3 is a partial cross-sectional view of the electric machine 20 that shows four of the slots 34. The slots 34 are known as "open slots" as each slot 34 has a slot opening 50 defined between tips 52 of the adjacent teeth. Opens slots ease manufacturing of the stator 22, but increase the likelihood of unwanted torque ripple and other negative characteristics. Previous designs have proposed to insert metal wedges in the slot openings to completely close the slots, similar to closed slots designs. These designs, however, also produce unwanted characterizes such as a short, high permeance path for magnetizing flux that is counter-productive for torque generation below rated operating conditions.

Referring to FIG. 4, this application discloses slot closers 60 that include both conductive and insulative materials to create nonmagnetic gaps within the slots closers 60 to reduce torque ripple and other negative characteristics. In one embodiment, each slot closer 60 includes a case 62 and one or more flux bridges 64. The case 62 is formed of a material that is nonmagnetic and electrically non-conductive, e.g., plastic. The flux bridges 64 are a body of ferromagnetic material, e.g., a soft magnetic composite. The flux bridges 64 are completely contained within the case 62 so that portions of the case create nonmagnetic gaps between the flux bridges 64 and the teeth 33. As used here, "nonmagnetic gap" does not necessarily refer to a void space, i.e., an air gap, but rather refers to a magnetic void due to the presence of an insulative material e.g. air, plastic, etc., interfacing between two or more magnetic components.

In the illustrated embodiment of FIG. 4, each slot closer 60 includes a first flux bridge 64a and a second flux bridge 64b. Each of the first and second flux bridges are encapsulated by the case 62 to surround the flux bridges 64 in a nonmagnetic and electrically non-conductive material. For example, the case 62 includes a first portion 66 disposed between the flux bridge 64a and the tooth 33a to create a nonmagnetic gap 70. The case 62 also includes a second portion 68 disposed between the flux bridge 64b and the tooth 33 to create a second nonmagnetic gap 72. A third portion 74 of the case 62 is disposed between the first flux bridge 64a and the second flux bridge 64b to create a third nonmagnetic gap 76. A radially outer portion 78 of the case 62 separates the flux bridges 64 from the windings 40 to create a fourth nonmagnetic gap 80, and a radially inner portion 82 encloses the radially inboard side of the flux bridges 64.

Referring to FIGS. 4 and 5, each flux bridge 64 may include a prismatic body 90 having opposing end faces 92 and a plurality of sides extending between the end faces. In the illustrated embodiment, the body 90 includes four sides 94, 96, 98, and 100, and has a generally triangular cross section. Of course, other geometries are contemplated (see FIGS. 7 and 8 for example). The first and second flux bridges 64a and 64b may be identical components that are disposed in the case 62 in different orientations. The slanted sides 96, which are angled at an acute angle relative to side 94, allow the flux bridges 64a, 64b to overlap while maintaining the third nonmagnetic gap 76.

The slot closers 60 a be formed by first manufacturing the flux bridges 64 and encapsulating the flux bridges 64 with a resin, which hardens to form the case 62. Alternatively, a fully formed case 62 may be manufactured that includes openings for receiving the flux bridges 64 therein. The flux bridges 64 are then inserted into the openings of the case 62 to complete the assembly.

Referring back to FIGS. 3 and 4, the slot closers 60 may have a length that is substantially equal to the length of the stator core 32, e.g., distance between the ends 36 and 38. The flux bridges 64 may be continuous along the slot closers 60 and also have a length that is substantially equal to the length of the core 32. The slot closers 60 may be installed in the slot openings 50 by inserting the slot closers 60 into the openings 50 from one end of the core 32.

The teeth 33 and the slot closer 60 may include features that cooperate to retain the slot closer 60 in the slot openings 50. For example, the teeth 33 may include a recessed portion 102 that receives a projection 104 of the slot closer 60. The recessed portion 102 may be formed on each opposing side of the teeth 33 and each opposing side of the slot closer 60 may include the projection 104 to fully secure the slot closers 60 in place. The recessed portions 102 may extend along a length of the teeth 33 and the projections 104 may extend along the length of the slot closers 60.

The slot closers 60, which include both conductive, (e.g., flux bridges 64) and insulative (e.g. case 62 materials) provide a high permeability path for the magnetizing flux crossing the air gap 71 between the stator 22 and the rotor 24 and provide improved characteristics at both high-torque and low-torque operating points. At high torque, the flux bridges 64 provide a path for extraneous leakage flux that can contribute to torque ripple, simultaneously, at low torque, the non-magnetic gaps prevent excessive magnetizing flux from being lost to leakage. The previous, metal wedge slot closers, do not have any non-magnetic gaps and are unable to prevent excessive magnetizing flux from being lost to leakage during low-torque operation.

Figure 6:
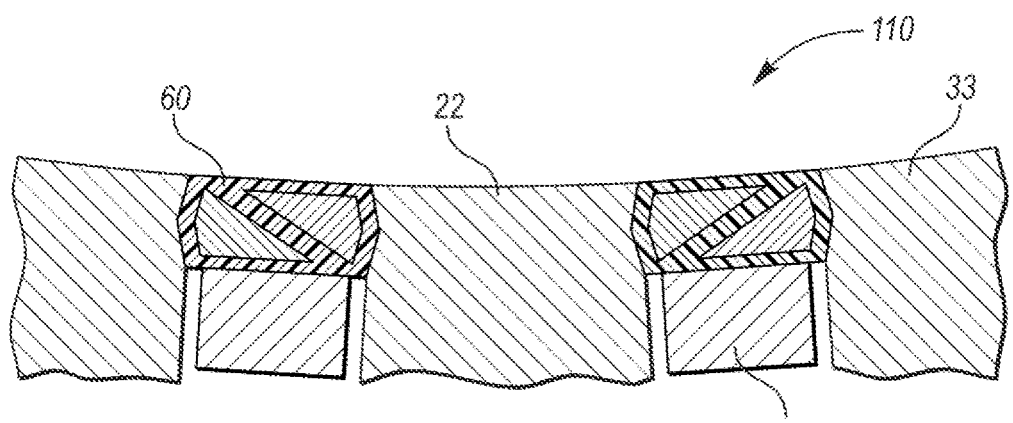
FIG. 6 is a partial cross-sectional view of another stator.

The slot closers 60 may all be arranged in the slot openings 50 in the same orientation as shown in FIG. 3. Alternatively, the slot closers 60 may be placed in different orientations in different ones of the slots 34. As shown in FIG. 6, the orientation of the slot closers 60 may alternate along the circumferential direction of the stator core 32. In FIG. 6, adjacent slot closers are rotated 180° about their longitudinal axis relative to each other. This can be used to tune the torque ripple response, for instance, by increasing the torque ripple below rated torque in exchange for decreasing the torque ripple at rated torque.

Figure 7:
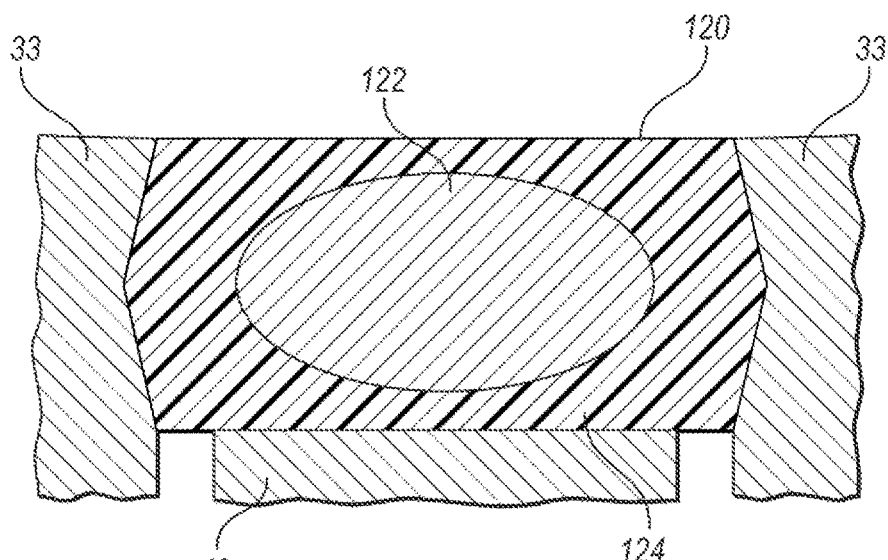
FIG. 7 is a cross-sectional view of a slot closer according to another embodiment.

The flux bridges may have many different sizes, shapes, and orientations to meet the specific needs of a particular electric machine. FIG. 7 illustrates another slot closer 120 that includes a single flux bridge 122 disposed in a case 124. Similar to the above described slot closers 60, the case 124 encapsulates the flux bridge 122 to create nonmagnetic gaps between the flux bridge 122, the stator teeth 33, and the windings 40. The flux bridge 122 may be cylindrical and have an elliptical cross-sectional shape in which the major axis extends between the teeth and the minor axis extends in the radial direction of the stator core 32.

Figure 8:
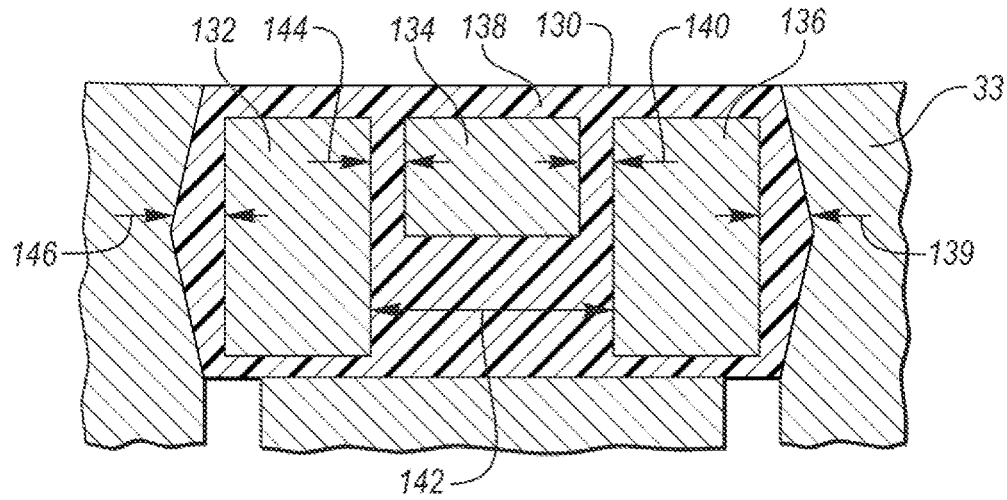
FIG. 8 is a cross-sectional view of a slot closer according to yet another embodiment.

Referring to FIG. 8, in yet another embodiment, a slot closer 130 includes three flux bridges 132, 134, and 136 disposed within the case. Each of the flux bridges is completely surrounded by portions of the case 138 to create a plurality of non-magnetic gaps. A first portion of the case 138 is disposed between the flux bridge 136 and the tooth 33 to create a first nonmagnetic gap 139. A second portion of the case 138 creates a nonmagnetic gap 140 between the flux bridge 134 and the flux bridge 136. A third portion of the case 138 creates a nonmagnetic gap 142 between the flux bridge 132 and the flux bridge 136. A fourth portion of the case 138 creates a nonmagnetic gap 144 between the flux bridge 132 and the flux bridge 134. A fifth portion of the case 138 creates a nonmagnetic gap 146 between the flux bridge 132 and the tooth 33.

The three flux bridges 132, 134, and 136 may be substantially identical, have different sizes and shapes, or combinations thereof. For example, the three flux bridges may be prismatic bodies having a rectangular cross section, but with the flux bridges 132 and 136 being larger than the flux bridge 134. Of course, other combinations are possible, which allows the slot closers to be tuned to the particular electric machine they are installed in.

Figure 9:
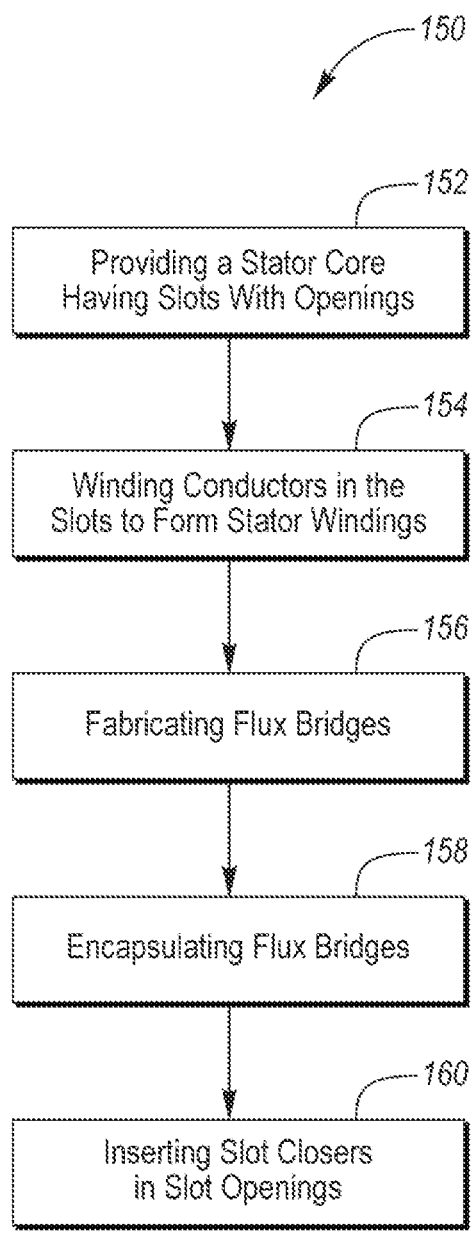
FIG. 9 is a flow chart illustrating a method of manufacturing a stator.

Referring to FIG. 9, a method 150 of manufacturing a stator includes providing a stator core having slots with openings at step 152. The stator core may be the same or similar to the above described stator core 32. At step 154, conductors are installed in the slots to form the stator windings. The windings may be distributed, concentrated, or hairpin windings. At step 156, flux bridges are fabricated from a ferromagnetic material. The flux bridges may be fabricated to have a variety of different shapes and sizes as described above. The flux bridges are encapsulated in nonmagnetic cases to form a plurality of slot closers at step 158. The nonmagnetic cases may be formed by overmolding the flux bridges in an overmolding material such as plastic resin. Depending upon the embodiment, multiple flux bridges may be arranged in a spaced relationship and encapsulated to form slot closers with multiple flux bridges. At step 160, the slot closer are inserted into the slot openings such that each nonmagnetic cases forms at least one nonmagnetic gap between a corresponding one of the flux bridges and the stator to reduce potential for torque ripple.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
    a stator having teeth that define open slots; and
    slot closers, each including a first flux bridge, a second flux bridge, and a third flux bridge surrounded by a nonmagnetic case and disposed between adjacent ones of the teeth with the case engaging and spanning the adjacent teeth, wherein the case forms nonmagnetic gaps between the flux bridges and the adjacent teeth, respectively, to reduce potential for torque ripple, wherein the second flux bridge is placed in the case such that a portion of the case is disposed between the first and second flux bridges to form a second nonmagnetic gap between the first and second flux bridges, and the third flux bridge placed in the case between the first and second flux bridges such that portions of the case are disposed between the first and third flux bridges to form a third nonmagnetic gap and between the second and third flux bridges to form a fourth nonmagnetic gap, respectively, and wherein the third flux bridge has a smaller cross-sectional area than the first flux bridge.

2. The electric machine of claim 1, wherein the first, second, and third flux bridges are bodies of ferromagnetic material.

3. The electric machine of claim 1, wherein the second nonmagnetic gap is angled relative a radially inner side of the case.

4. The electric machine of claim 1, wherein the first, second, and third flux bridges are encapsulated in the case.

5. The electric machine of claim 1, wherein the case is plastic.

6. The electric machine of claim 1, wherein the first, second, and third flux bridges extend a length of the stator.

7. The electric machine of claim 1 further comprising windings disposed in the slots between a radially outer end of the slots and the slot closers.

8. The electric machine of claim 1, wherein the adjacent teeth each define a recessed portion configured to receive a projection of the case to secure the slot closer in a corresponding one of the slots.

9. An electric machine comprising:
    a stator having radially extending teeth that define slots between adjacent teeth, the slots having slot openings defined between tips of the adjacent teeth; and
    slot closers disposed in the slot openings to close the slots, each of the slot closers including a first flux bridge, a second flux bridge, and a third flux bridge surrounded by a nonmagnetic case and disposed between adjacent ones of the teeth with the case engaging and spanning the adjacent teeth, wherein the case forms nonmagnetic gaps between the flux bridges and the adjacent teeth, respectively, to reduce potential for torque ripple, wherein the second flux bridge is placed in the case such that a portion of the case is disposed between the first and second flux bridges to form a second nonmagnetic gap between the first and second flux bridges, and the third flux bridge placed in the case between the first and second flux bridges such that portions of the case are disposed between the first and third flux bridges to form a third nonmagnetic gap and between the second and third flux bridges to form a fourth nonmagnetic gap, respectively, and wherein the third flux bridge has a smaller cross-sectional area than the first flux bridge, wherein each of the first, second, and third flux bridges has an elongate body oriented within the slot closers to extend in a longitudinal direction of the stator.

10. The electric machine of claim 9, wherein a portion of the case is disposed between one of the adjacent teeth and the flux bridge to form a nonmagnetic gap.

11. The electric machine of claim 9, wherein the flux bridge is formed of a ferromagnetic material.

12. The electric machine of claim 11, wherein the case is plastic.

13. The electric machine of claim 9, wherein the slot closers extend a length of the slots.

14. The electric machine of claim 9 further comprising a rotor supported for rotation within the stator, and wherein a portion of the case is disposed between the flux bridge and the rotor.

15. A method of assembling a stator comprising:
providing a stator having teeth that define open slots;
winding conductors in the slots;
fabricating a plurality of flux bridges from ferromagnetic material such that each of the flux bridges has an elongate body;
encapsulating first, second, and third ones of the flux bridges in a nonmagnetic case such that the first, second, and third flux bridges are spaced apart with portions of the nonmagnetic case therebetween to form a slot closer in which the nonmagnetic case forms nonmagnetic gaps between the flux bridges and the adjacent teeth, respectively, to reduce potential for torque ripple, wherein the second flux bridge is placed in the case such that a portion of the case is disposed between the first and second flux bridges to form a second nonmagnetic gap between the first and second flux bridges, and the third flux bridge is placed in the case between the first and second flux bridges such that portions of the case are disposed between the first and third flux bridges to form a third nonmagnetic gap and between the second and third flux bridges to form a fourth nonmagnetic gap, respectively, and wherein the third flux bridge has a smaller cross-sectional area than the first flux bridge; and
inserting the slot closer into one of the openings.

16. The method of claim 15, wherein the encapsulating further includes overmolding the flux bridge in an overmolding material that hardens to form the case.

17. The method of claim 15, wherein the flux bridge has a length that is substantially equal to a length of the stator.

* * * * *